No. 685,010. Patented Oct. 22, 1901.
L. K. STEVENS.
TOOL FOR SETTING SCREW STUDS.
(Application filed Mar. 21, 1901.)
(No Model.)
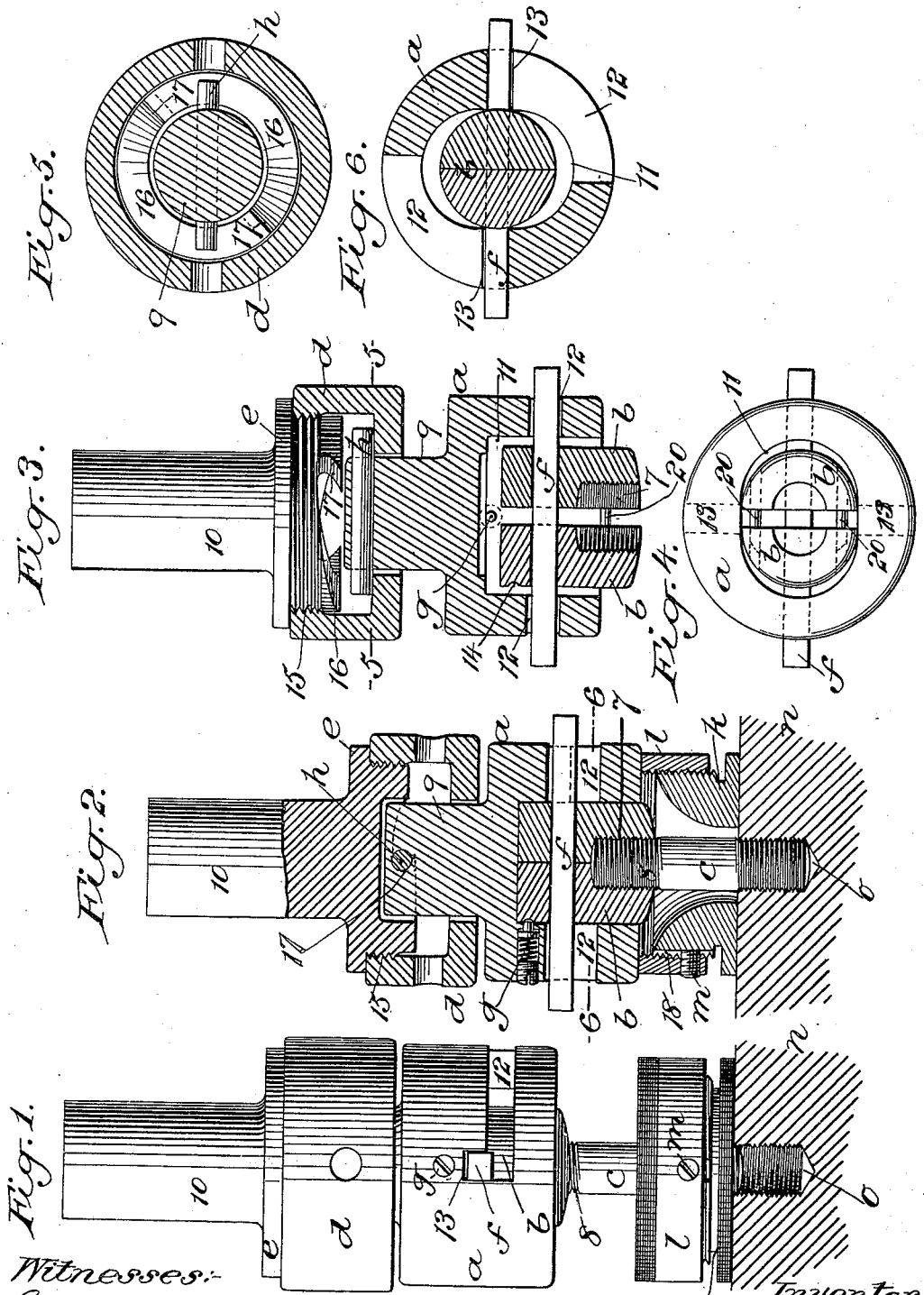
Witnesses:
George Barry
Henry Thieme
Inventor
Leon K. Stevens
by attorneys
Brown & Seward

UNITED STATES PATENT OFFICE.

LEON K. STEVENS, OF BROOKLYN, NEW YORK.

TOOL FOR SETTING SCREW-STUDS.

SPECIFICATION forming part of Letters Patent No. 685,010, dated October 22, 1901.

Application filed March 21, 1901. Serial No. 52,149. (No model.)

*To all whom it may concern:*

Be it known that I, LEON K. STEVENS, a citizen of the United States, and a resident of the borough of Brooklyn, in the city and State of New York, have invented a new and useful Improvement in Tools for Setting Screw-Studs, of which the following is a specification.

A tool embodying this invention is designed to be attached to any suitable rotary spindle—the spindle of a drilling machine, for example—for doing the work of setting screw-studs one after another while said spindle is continuously rotating in one direction and without the necessity of stopping or reversing the spindle and consequent loss of time between the successive operations of the tool.

I will proceed first to describe an example of this tool with reference to the accompanying drawings and afterward to point out its novelty in claims.

Figure 1 in the drawings represents a side view of the tool and its appurtenances complete; Fig. 2, a central vertical section of the same; Fig. 3, a vertical sectional view of the tool proper without the stop shown under it in Figs. 1 and 2; Fig. 4, an inverted plan corresponding with Fig. 3; Fig. 5, a horizontal section in the line 5 5, showing the parts above said line; and Fig. 6 a horizontal section in the line 6 6 of Fig. 2.

Similar letters and numbers of reference designate corresponding parts in all the figures.

$a$ is a chuck containing a divided clamping-nut $b$. The head or upper part of this nut is closed, and the female screw-thread 7 in its lower part fits the upper screw-thread 8 of the stud $c$ to be set. The chuck has a stem 9, which is received within a clutch-box or holder $d\,e$, the stem 10 of which is to be held firmly within a rotary driving-spindle, (not shown,) the spindle of a drilling-machine, for example. The two halves of the nut $b$ are loosely fitted together with dowel-pins 20. Its exterior is cylindrical or of circular form, as shown in Fig. 6; but the interior of the socket 11 of the chuck $a$ is of elongated form, as shown in the same figure and in Fig. 4, its smaller diameter being sufficient to just closely embrace the nut $b$ when the latter is closed, as shown in Fig. 6, and its greater diameter being sufficient to allow the nut to open, as shown in Fig. 4. The nut $b$ is attached to the chuck $a$ by a key $f$, which passes through them both, circumferential slots 12 being provided for said key in opposite sides of the socket 11 to permit the turning of the chuck or nut, the one relatively to the other, and the said slots being each provided with an angular offset 13, into which the key $f$ may enter, as shown in Figs. 1 and 2, to lock the nut in the closed condition when it is held closely within the narrower width of the socket, as shown in Fig. 6. Above one of the offsets 13 of the slots in the chuck is a small round-pointed spring-pressed retaining-pin $g$, which, as shown in Fig. 2, enters a shallow groove 14, formed around the exterior of the nut, for retaining the key $f$ within the said offsets 13, and so keeping the nut locked when closed. This pin $g$ is capable of yielding easily to permit the liberation of the nut.

The holder or clutch-box $d\,e$ is made in two parts, its upper part or head $e$, on which the stem 10 is formed, having also upon it a screw-thread 15, which is permanently screwed into the box-like lower part or body $d$. The stem 9 of the chuck enters through an opening in the bottom of the box $d$ and is retained always attached to the holder by a pin $h$, inserted through the stem 9 within the box, room being left in the box for a considerable independent upward movement of the chuck.

Within the head of the holder there is formed one member 16 17 of an automatic clutch, the other member of which is the pin $h$ in the chuck. The said clutch member 16 17 consists of two inclined faces 16 in the head terminating in two hooks 17 for engagement with the pin $h$, said hooks having their faces inclined downward toward their points, as shown in Fig. 3.

$k\,l$ designate an adjustable stop for determining the depth to which the studs $c$ are to be screwed into or set in the casting $n$ or any body in which there are tapped holes for their reception. This stop is represented as consisting of an externally-screw-threaded base $k$ and an internally-screw-threaded cap $l$, fitted to the screw-thread of the base and adjustable by being turned thereon to raise or lower its upper face. This adjustment is secured by a set-screw $m$, which screws through one side of the cap and enters a groove 18 in the side of the base. There may be two or more of these grooves 18 at equal distances apart to provide for securing the adjustment to any fraction of a turn of the screw-threads of the base and cap.

To explain the operation of this tool in setting studs, I will first suppose the clutch box or holder $d\ e$ to be in constant rotation with its driving-spindle and the chuck $a$ to be disengaged by its own weight from the clutch-hooks 17 and hanging loose, as shown in Fig. 3, with its pin $h$ resting on the bottom of the box $d$. When a stud is to be set, the driving-spindle, with the clutch-box and the chuck, are then raised by the attendant to raise the bottom of the chuck $a$ and its nut $b$ above the casting or body $n$, in which the tapped stud-hole $o$ has been prepared high enough to permit the entry of the lower end of the stud into the said hole and to leave room enough between the upper end of the stud and the bottom of the chuck to admit a hand. The attendant then enters the stud into the hole by hand and places the stop $l\ m$ over it on the work, and if the nut $b$ be not already closed he takes hold of the key $f$ and turns it in the slots 12 until it arrives under the offsets 13. The nut being now closed, as shown in Figs. 2 and 6, he locks it by striking it up by hand to bring the key into the offsets 13, where it is retained by the spring-pressed pin $g$ entering the shallow groove 14 in the nut. He then brings the tool over the stud or moves the body $n$ to a position to bring the stud under the tool, and he feeds down the driving-spindle to bring the nut $b$ on the stud, and in so doing causes the clutch-hooks to engage with the pin $h$ of the chuck and causes the chuck and nut to be set in rotary motion. The nut then runs down on the upper screw-thread of the stud until its head strikes the upper end of the stud, as shown in Fig. 2, when the continued rotary motion of the nut screws the stud into the hole $o$; but when the bottom of the chuck $a$ strikes the stop $l\ m$ the further continued rotation of the nut with the chuck while the descent of the chuck is arrested continues to screw the stud into the hole and so to draw down and liberate the key $f$ from the offsets 13 of the slots 12, the nut at the same time liberating itself from the pin $g$, after which the chuck is free to turn on the nut to the extent permitted by the length of the said slots, which is sufficient to bring the greater diameter of the socket 11 to the position to permit the opening of the nut, as shown in Figs. 3 and 4. The operator then raises the driving-spindle, which takes up the chuck and the nut with it; but after the chuck and nut have been taken up a short distance only, the weight of the chuck and nut being sufficient to carry the pin $h$ down and free of the inclines of the clutch-hooks 17, the chuck drops and is left hanging free from the clutch, as shown in Fig. 3, without rotating therewith and is ready for applying the tool to a new stud without stopping the rotation of the spindle, which continues always rotating in the same direction.

What I claim as my invention is—

1. In a tool for setting screw-studs, the combination of a chuck having a socket the internal diameter of which is elongated in one direction and in the sides of which are circumferential slots, a divided nut for the reception of a screw-stud fitted to turn in said socket, and a key inserted transversely through said slots and through the nut for turning the latter in the socket for opening and closing it, substantially as herein described.

2. In a tool for setting screw-studs, the combination of a chuck having a socket the internal diameter of which is elongated in one direction and in the sides of which are circumferential slots having angular offsets, a divided nut for the reception of a screw-stud fitted to turn in said socket, and a key inserted transversely through said slots and through the nut and adapted to enter the offsets in the slots for locking the nut in a closed condition, substantially as herein described.

3. In a tool for setting screw-studs, the combination of a chuck having a socket the internal diameter of which is elongated in one direction and in the sides of which are circumferential slots having angular offsets, a divided nut for the reception of a screw-stud fitted to turn in said socket, a key inserted transversely through said slots and through the nut for locking the latter, and a spring-pressed retaining-pin fitted to the chuck-socket to engage with a groove in the nut for retaining said key in said offset and keeping the nut locked in closed condition, substantially as herein described.

4. In a tool for setting screw-studs, the combination of a chuck and means therein for taking hold of and releasing a stud, a rotary holder for said chuck, and a clutch in said holder for automatically engaging the chuck therewith and disengaging it therefrom, substantially as herein described.

5. In a tool for setting screw-studs, the combination of a chuck and means therein for taking hold of and releasing a stud, a rotary holder for said chuck, and a clutch between said holder and chuck from which the chuck disengages itself by its own weight, substantially as herein described.

6. In a tool for setting screw-studs, the combination of a chuck having a stem, means within said chuck for taking hold of and releasing a stud, a rotary holder consisting of a box having inclined clutch-hooks on its head, projections from said stem within the box for engagement with said clutch-hooks and for suspending the chuck in said box disengaged from said hooks, substantially as herein described.

In testimony that I claim the foregoing as my invention I have signed my name, in presence of two witnesses, this 14th day of March, 1901.

LEON K. STEVENS.

Witnesses:
 FREDK. HAYNES,
 HENRY THIEME.